H. G. MORDAUNT.
CAMERA.
APPLICATION FILED FEB. 12, 1917.
1,253,077.
Patented Jan. 8, 1918.
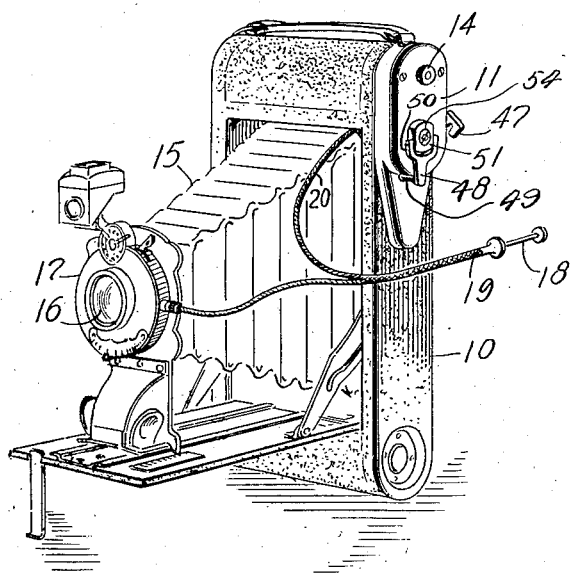
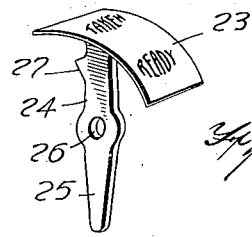
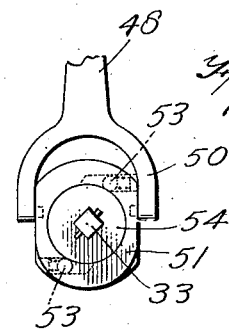
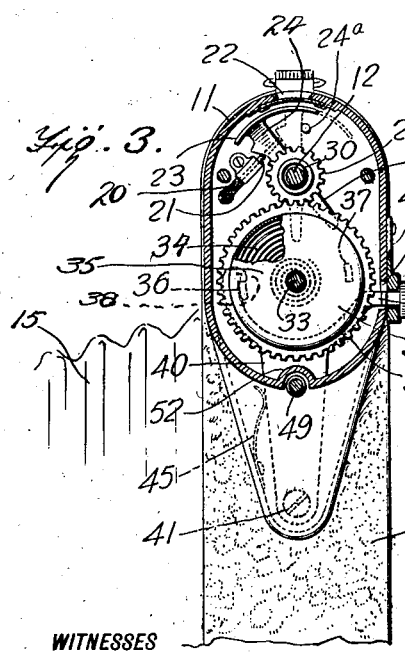
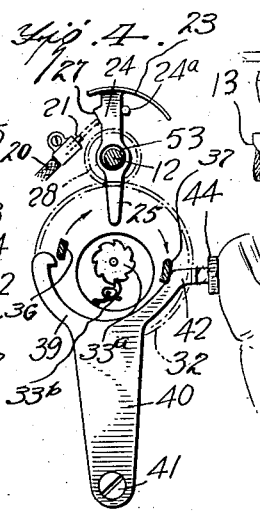
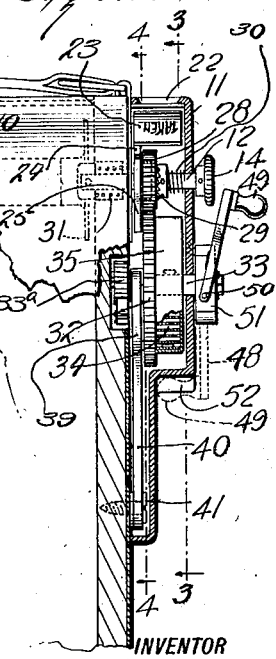
WITNESSES
INVENTOR
HARRY G. MORDAUNT,
BY
ATTORNEYS

UNITED STATES PATENT OFFICE.

HARRY G. MORDAUNT, OF SALT LAKE CITY, UTAH.

CAMERA.

1,253,077.  Specification of Letters Patent.  Patented Jan. 8, 1918.

Application filed February 12, 1917. Serial No. 148,275.

*To all whom it may concern:*

Be it known that I, HARRY G. MORDAUNT, a citizen of the United States, and a resident of Salt Lake City, in the county of Salt Lake and State of Utah, have invented a certain new and useful Improvement in Cameras, of which the following is a specification.

My present invention relates generally to cameras, and more particularly to a camera having a film winding apparatus and a film signal, the apparatus operating not only to turn the film from one position to another in order to bring up an unexposed portion of the film, but to move the signal from one position to another, my present invention thus improving the apparatus and means disclosed in my co-pending applications, one filed July 25, 1916, Serial Number 111,124, and the other filed January 24, 1917, Serial 114,276.

The primary object of my present improvement is to simplify the construction shown in my applications above referred to, and bring about equally effective results with a more simple, compact apparatus, and without necessitating the application of attachments to the film or otherwise deviating from the film now in use.

Other objects relating for the most part to the details of construction of my present improvements, will be better understood from the following description thereof, reference being made to the accompanying drawing, forming a part of this specification, and wherein:

Figure 1 is a perspective view of a camera provided with my improvements;

Fig. 2 is a vertical section through a portion of the camera and through my improvements;

Fig. 3 is a vertical section taken substantially on line 3—3 of Fig. 2;

Fig. 4 is a similar view taken substantially on line 4—4 of Fig. 2;

Fig. 5 is a detail side view, enlarged, of the spring winding parts, and

Fig. 6 is a detail perspective view of the signal.

Referring now to these figures, I have generally indicated an accepted type of camera at 10, in Fig. 1, at one side of which my improvements are mounted within a supplemental casing 11, through which the shaft 12 of the take-up roll 13 for the film is extended, as best seen in Fig. 2, its knurled head 14 by means of which it may be manually rotated, being located exteriorly of the supplemental casing 11.

In Fig. 1 the bellows of the camera appear at 15, the lens at 16, and the shutter casing at 17, the shutter being actuated by a wire release 18 extending through the usual flexible protecting casing or sheath 19, from an intermediate point of which I extend a second casing or sheath 20, through which a wire 21 projects, the outer end of which is connected to the wire 18, and the inner end of which projects through the inner end of the sheath 20, the latter of which terminates within the upper portion of the supplemental casing 11, as shown best in Fig. 3, and is there secured.

The supplemental casing 11 is provided at its upper end with a sight opening 22, adjacent the top of the camera, and through which the upper arcuate plate 23 secured upon the upper end of a signal lever 24 is visible, lever 24 being intermediately fulcrumed upon the inner portion of the shaft 12 of the take-up roller with its lower end or tail 25 depending therebelow, for a purpose to be presently described, the lever 24 having above its intermediate opening 26 through which the shaft 12 extends, a side lug 27 immediately adjacent the inner end of the actuating wire 21, so that when the shutter is opened in the picture taking operation, by pressure against the wire release 18, the inner end of wire 21 will be forced against the lug 27 so as to shift the signal lever 24 to the vertical operative position limited by a stationary lug or stop piece 24$^a$ shown in dotted lines in Fig. 3, and in full lines in Fig. 4, the plate 23 having the word "Taken" imprinted upon its surface above the upper end of lever 24, so as to show through the sight opening 22 when the lever is in vertical position, and thus indicating that the film has been used.

Loosely mounted upon the shaft 12 of the take-up roll 13, is a gear 28 having a clutch face at one side for engagement by a clutch member 29 secured upon said shaft, a spring 30 coiled about the shaft 12 between clutch member 29 and the outer wall of the supplemental casing 11 serving to normally hold the clutch faces together, assisted by the usual inner spring 31, as seen in Fig. 2, of the take-up shaft.

The gear 28 is in mesh with a lower enlarged gear 34, the latter being mounted upon a shaft 33 and actuated by a spring 32 within a housing 35, the inner end of which spring is secured to the shaft 33 so that by rotating the latter the spring may be wound. At its opposite side, the gear 34 is provided with diametrically opposed lugs 36 and 37, as best seen in Fig. 4, each of which is engageable by means of a hook 38 at the upper arcuate end 39 of a controlling lever 40, the lower end of which is pivoted at 41 within the supplemental casing 11, and the upper end of which has an extension 42 opposite the hook 38, projecting laterally through an opening 43 in one side of the supplemental casing 11, and provided with a finger piece 44.

Normally the hook 38 is in engagement with one of the lugs 36 and 37 of the gear 32, to lock the film winding parts against movement, it being necessary to press the finger-piece 44 inwardly in order to shift the hook 38 out of engaged position, and thus permit of rotation of the gear 32, releasing movement of the controlling lever 40 being against the tension of a spring 45 within the lower portion of the casing 11, and bearing thereagainst.

As seen in Fig. 4, the hook 38 has just been released from the lug 36, to permit of movement of the gear 32 in the direction of the arrows, which forces the opposite lug 37 in each instance against the upper arcuately curved portion 39 of the lever 40, opposite the hook 38, so as to assist spring 45 in returning the controlling lever 40 to its normal position, so that the hook 38 will receive and engage the lug 37 at the completion of a half turn of the gear wheel 32, this structure being particularly effective where the operator momentarily neglects to release pressure upon the finger-piece 44, after pressing the same inwardly.

Accidental inward pressure upon the finger-piece 44 is prevented by a latch 46 pivoted upon the adjacent side of the supplemental casing 11, the slotted end 47 of which is movable to partly embrace the extension 42 of lever 40, beneath the finger piece 44.

The shaft 33 may be rotated to rewind the spring 34 when necessary, by means of an external lever 48 having an outer crank 49 and an inner yoke 50, the latter of which is pivotally connected to opposite sides of a clutch piece 51, as seen in Fig. 5, the pivotal connection of yoke 50 permitting the lever 48 to be moved from its operative position, shown in full lines in Fig. 2, to the inoperative position thereof, shown in dotted lines in the same figure, wherein the crank 49 is received in a depression 52, as seen in Fig. 3, in the lower portion of the supplemental casing 11. The clutch piece 51 carries internal friction clutch members 53, operable against the periphery of a disk 54, the latter of which is secured to the outer squared portion of shaft 33. The inner end of this shaft 33 may have a conventional ratchet mechanism including a pawl carried by the casing 10, so that reverse rotation of the shaft 33 is thus prevented when the lever 48 is in the inoperative position, as described.

It will be noted that the signal lever 24 before described, is prevented from accidental displacement by means of a spring 53 coiled around the shaft 12 between the gear 28 and the said lever, and that the lower portion or tail 25 of said lever extends downwardly into the path of movement of the lugs 36 and 37 so that upon release of the film winding parts, the upwardly moving lugs will engage the lower end of the lever and rock the latter to its inclined position, shown in full lines in Fig. 3.

The upper arcuate plate 23 of the signal lever may have the word "Ready," as shown in Fig. 6, imprinted thereon, and spaced from the word "Taken," so that, when the signal lever is rocked to its inactive position, the word "Ready" will show through the sight opening 22 and indicate that the succeeding film is in position ready for the next picture taking operation.

It is obvious from the foregoing that my invention provides for a novel coöperation between the film winding and signal parts, such as to enable their proper operation, at the proper time, without the use of attachments or the like to the film as proposed in my applications first above referred to, and thus permitting the operator to utilize the ordinary film in a camera to which my improvements have been applied.

It is further obvious that my invention provides for a construction simple and comparatively inexpensive in its nature, which will avoid material addition to the camera in weight, and bulk, which will present a neat appearance, and which will be effective and efficient at all times for the purposes stated.

I claim:

1. In a camera, the combination with the shutter operating mechanism, of a film winding apparatus including a spring actuated rotatable member, having lugs projecting from one face thereof, a manually shiftable lever having a hook normally engaging one of the lugs to maintain the winding mechanism inoperative, and a signal movable to active position by said shutter operating mechanism, and having a portion thereof extending into the path of movement of the said lugs for engagement by one of the lugs to move the signal to inactive position when the film winding mechanism is released.

2. In a camera, the combination with shutter operating means, and the take up roll and its shaft, of a motor and a normally inactive film-winding apparatus including a rotatable member having projections, a manually releasable member normally engaging the said projections, a casing within which the said film-winding mechanism is mounted, having a sight opening, a signal arm pivotally mounted adjacent the sight opening and having a signal, means actuated by the shutter operating means for moving said arm to operative position, and means for moving the lever to inoperative position, including an extension thereof projecting into the path of the projections of said rotatable member of the film winding mechanism.

3. A film winding and film signal attachment for cameras, comprising a casing connected with the camera casing and provided with a sight opening, a signal within the casing, a shutter operating mechanism having connection with said signal to move the same to active position adjacent the sight opening, when the camera is operated to take a picture, a film winding apparatus also within the casing and including a motor and a normally inoperative member having projections, manually releasable controlling means normally engaging said projections to hold the said member inoperative, and means carried by the signal and extending into the path of movement of the said projection, when the signal is in active position, for engagement by the projection to move the signal to inactive position when the said member is released.

HARRY G. MORDAUNT.